United States Statutory Invention Registration [19]

[11] Reg. Number: H559

Brown

[43] Published: Dec. 6, 1988

[54] ADVANCING GELATION FRONT CURE TECHNIQUE

[75] Inventor: Scott C. Brown, Sacramento, Calif.

[73] Assignee: The United States of America as represented by the Secretary of the Air Force, Washington, D.C.

[21] Appl. No.: 48,856

[22] Filed: May 12, 1987

[51] Int. Cl.[4] ..... B29C 45/00; B29C 47/00; B29C 35/02; B29C 43/02

[52] U.S. Cl. ..... 264/102; 264/510; 264/519; 264/257; 264/327; 425/812

[58] Field of Search ..... 264/101, 102, 327, 519, 264/520, 521, 257, 258, 259, DIG. 78, DIG. 42, 236, 347, 265, 25, 272.13, 331.22; 156/87, 381, 382; 425/504, 507, 812, 407

[56] References Cited

U.S. PATENT DOCUMENTS

| | | | |
|---|---|---|---|
| 2,527,387 | 10/1950 | Arndt | 264/327 |
| 2,541,297 | 2/1951 | Sampson | 264/327 |
| 2,840,858 | 7/1958 | Rainer | 264/265 |
| 3,369,274 | 2/1968 | Dicks | 264/327 |
| 3,444,275 | 5/1969 | Willett | 264/102 |
| 3,505,441 | 4/1970 | Goetgheluck | 264/327 |
| 3,763,293 | 10/1973 | Nussbaum | 264/327 |
| 3,933,967 | 1/1976 | Taylor | 264/327 |
| 4,095,480 | 6/1978 | Schwabauer | 264/327 |
| 4,172,872 | 10/1979 | Nagai | 264/327 |
| 4,201,742 | 5/1960 | Hendrey | 425/812 |
| 4,217,157 | 8/1980 | Stoltze | 264/102 |
| 4,357,381 | 11/1982 | Wilson | 264/327 |
| 4,404,261 | 9/1983 | Canning | 264/101 |
| 4,419,400 | 12/1983 | Hindersinn | 428/245 |
| 4,432,928 | 2/1984 | Barnard | 264/327 |
| 4,534,003 | 8/1985 | Manzione | 264/327 |
| 4,536,438 | 8/1985 | Bishop et al. | 428/246 |
| 4,539,253 | 9/1985 | Hirschbuehler et al. | 428/229 |
| 4,612,149 | 9/1986 | Iseler | 264/320 |

FOREIGN PATENT DOCUMENTS

| | | | |
|---|---|---|---|
| 0185617 | 10/1984 | Japan | 264/327 |

*Primary Examiner*—John F. Terapane
*Assistant Examiner*—J. E. Thomas
*Attorney, Agent, or Firm*—Bobby D. Scearce; Donald J. Singer

[57] ABSTRACT

A method for curing resin in the fabrication of a composite material is described comprising enclosing the composite material within a flexible vacuum enclosure, and substantially simultaneously pressing the material within the enclosure between first and second platens of a press to preselected pressure, evacuating the enclosure, selectively heating one of the platens according to a preselected scheme to preselected cure temperature to cure the resin within the material, and cooling the other platen to maintain a preselected temperature differential between the platens across the thickness of the material, whereby cure of the resin is effected in the material first near the heated platen and progresses through the thickness of the material toward the cooler platen as the material is heated to the cure temperature.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADVANCING GELATION FRONT CURE TECHNIQUE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to fabrication and curing methods for composite materials, and more particularly to a method for controlling resin cure in the fabrication of composites.

In existing fabrication processes for composite materials, resin cure often requires removal of volatile constituents through partially cured resin as a result of the curing process proceeding generally inwardly of the material. The resultant cured composite structure is therefore frequently characterized by an unacceptably high void volume and degree of microcracking.

The invention has substantially reduced in critical importance previously existing problems with curing processes for composite materials, and finds basis in part in the recognition that the mechanism and rate of removal of volatile constituents from the curing process changes upon gelation of the resin. By maintaining and controlling a preselected temperature differential across the thickness of a composite laminate during the curing process, and allowing one side of the laminate to breathe, a gel front is generated in the laminate which advances with cure of the resin from a heated non-breathing side of the laminate to the cooled breathing side. Volatile constituents from the curing process are transported toward the breathing side of the laminate ahead of the front through a less viscous, substantially uncured portion of the laminate which facilitates removal of the volatile constituents, avoids stresses internal of the laminate structure which would otherwise result in cracking, and substantially eliminates void formation resulting from trapped residual volatiles. The invention has particular application in fabricating thick or complex composite structures utilizing a condensation curing polymer.

It is therefore a principal object of the invention to provide an improved composite fabrication method.

It is another object of the invention to provide a method for controlling resin cure in the fabrication of composite materials.

These and other objects of the invention will become apparent as the detailed description of representative embodiments proceeds.

SUMMARY OF THE INVENTION

In accordance with the foregoing principles and objects of the invention, a method for curing resin in the fabrication of a composite material is described comprising enclosing the composite material within a flexible vacuum enclosure, and substantially simultaneously pressing the material within the enclosure between first and second platens of a press to preselected pressure, evacuating the enclosure, selectively heating one of the platens according to a preselected scheme to preselected cure temperature to cure the resin within the material, and cooling the other platen to maintain a preselected temperature differential between the platens across the thickness of the material, whereby cure of the resin is effected in the material first near the heated platen and progresses through the thickness of the material toward the cooler platen as the material is heated to the cure temperature.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
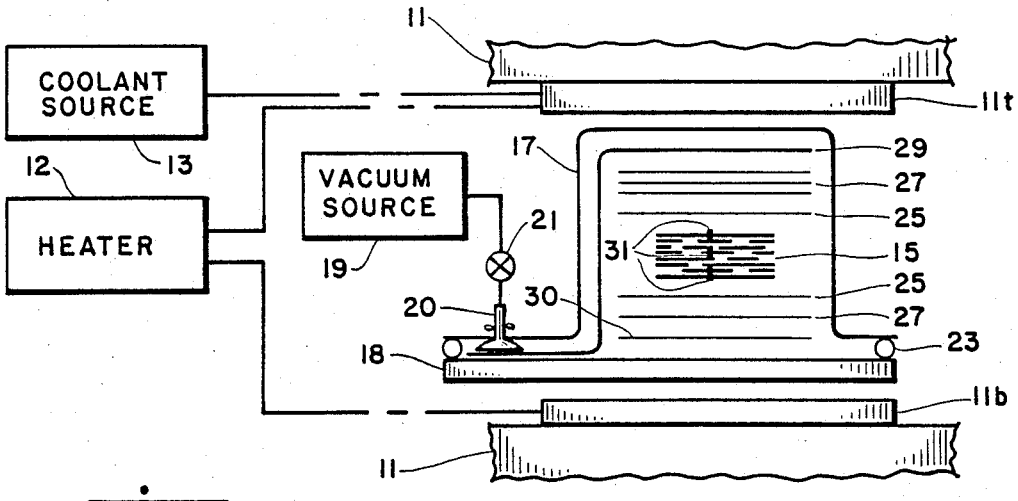
FIG. 1 is a schematic of a hydraulic press setup useful in practicing the advancing gel front method of the invention.

Referring now to FIG. 1 of the drawings, shown therein is a schematic of a hydraulic press setup useful in practicing the advancing gel front method of the invention. Hydraulic press 11 includes top platen **11*t* and bottom platen 11*b* having connected thereto means for controlled heating or cooling of the platens by heater 12 and coolant source 13 connected to platens 11*b*,11*t*. Heater 12 may be connected in conventional fashion to both platens 11*b*,11*t* for selective heating of one or both of them; top platen 11*t* may be selectively cooled as by cooled water circulation. Press 11 may otherwise be substantially conventional with a capacity of up to about 12** tons, cooling capacity of one platen down to about 20° C., and heating capacity up to about 200° C.

Laminate sample 15 to be cured according to the method of the invention is placed between the platens **11*b*,11*t* of press 11 within a flexible vacuum enclosure 17 substantially as shown in FIG. 1. In the practice of the invention, sample 13 may comprise thermally cured resin formulations of substantially any type, the method being particularly applicable to monitoring cure of condensation polymers in composite sheet material of from about 0.635 to 2.54 mm in thickness and cured at temperatures of up to about 163° C. Enclosure 17 is supported on a steel plate 18 in thermal contact with platen 11*b* for conducting heat from platen 11*b* into enclosure 17 to sample 15. Vacuum source 19 is operatively connected to enclosure 17 through vacuum port 20 and valve 21 for selective evacuation of enclosure 17. Flexible peripheral seal 23 between enclosure 17 and plate 18 may be included to seal enclosure 17 under the influence of vacuum source 19**.

Within enclosure 17, sample 15 is sandwiched between a pair of peel plies 25 of porous Teflon or similar material providing means to readily separate sample 15 for examination following cure as described below. Sample 15 and peel plies 25 are sandwiched between bleeder cloths 27 one of which is in laminar contact with breather mat 29 for facilitating removal of volatile constituents and otherwise for evacuating enclosure 17. Sheet 30 of Teflon or the like may be included between the assembly of 15,25,27 and plate 18 in order to absorb resin flow and prevent bonding of bleeding materials.

The mechanism and rate of removal of volatile constituents changes upon gelation as laminate sample 15 cures and, therefore, maintenance and control of a suitable temperature differential across the thickness of sample 15 according to invention, promotes controlled gelation across the thickness of sample 15 such that the heated (nonbreathing) side of sample 15 cures first, and a gel front is caused to proceed across the thickness of sample 15. Volatile constituents generated during the curing process are transported ahead of the gel front toward the cooled (breathing) side of sample 15 through a lesser cured, less viscous portion of the composite structure as the gel front advances.

Experiments were conducted in demonstration of the method of the invention on numerous samples of FM 5064, a laminate prepreg of phenolic resin impregnated graphite (U.S. Polymeric Corp), although it is clear that the method described herein is adaptable to the cure of other composite laminates as would occur to one with skill in the field of the invention guided by these teachings. Samples 15 of FM 5064 consisted of 30 plies in an overall laminate thickness of about 8.5 mm. It was first determined what the nature and extent is of the temperature gradient which may be maintained across the thickness of laminate sample 15 to be cured in the arrangement of FIG. 1. This was performed by controllably heating bottom platen **11*b* and cooling top platen 11*t*. Six thermocouples 31 were placed at six ply intervals within sample 15 substantially as shown in FIG. 1 to monitor the temperature at selected points across the thickness of sample 15. For optimum cure of most composite materials comprising sample 15, a pressure of about 150 to 250 psi in press 11 with a reduced pressure of about 25 in. Hg within enclosure 17** are sufficient.

Figure 2:
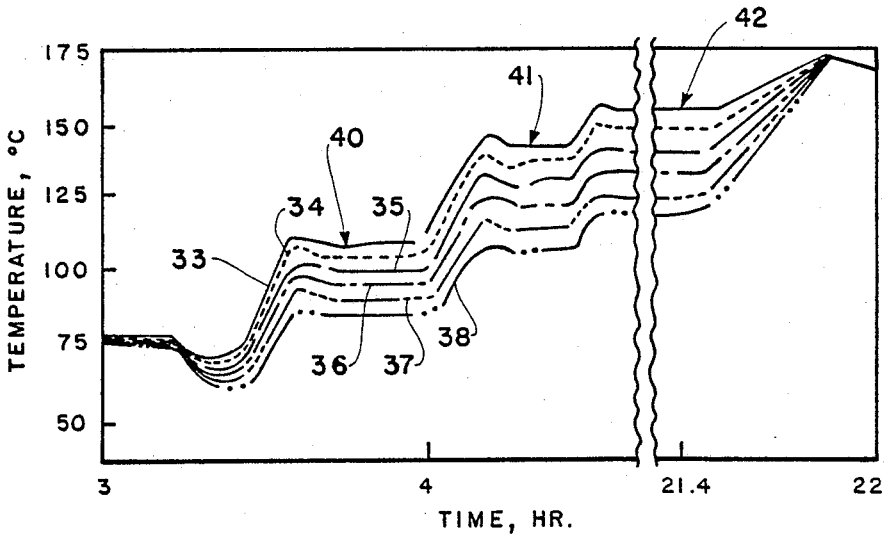
FIG. 2 is a graph of advancing gel front temperature differential with time for a sample of FM 5064, a phenolic resin impregnated graphite laminate prepreg.
Figure 3C:
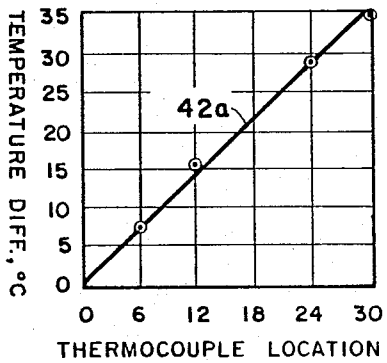
FIGS. 3A, 3B and 3C present temperature gradient profiles in the sample of FIG. 2 at three temperature plateaus during cure.
Figure 3B:
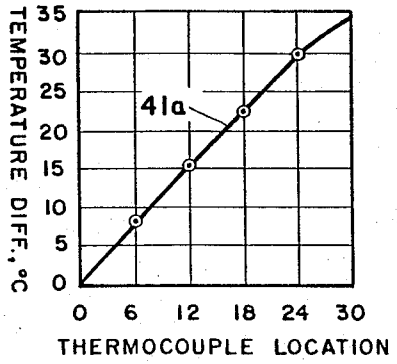
Figure 3A:
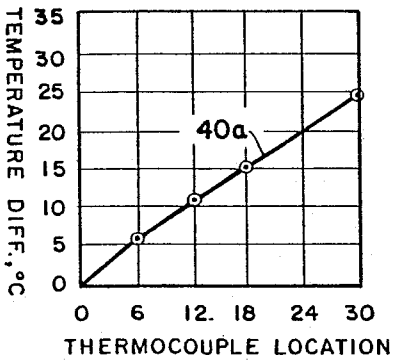

Referring now to FIG. 2, shown therein are the thermocouple data of advancing gel front temperature differential with time for a 30-ply sample of FM 5064 examined in the hydraulic press setup of FIG. 1 with thermocouples placed within the structure of sample 15 as just described. Bottom platen **11*b* was heated substantially as indicated by the time temperature scheme suggested in FIG. 2 under about 200 psi pressure and enclosure 17 under evacuation. Platen 11*t* was cooled by 20° C. circulating water. Plots 33–38 on FIG. 2 represent observed temperatures at respective thermocouple locations at the bottom of sample 15 at 6, 12, 18 and 24 ply intervals measured upwardly through sample 15, and at the top of sample 15. The data indicated a 23°–33° C. differential at each of three temperature plateaus 40,41,42 of the heating program. After 21 hours, both platens 11*b*,11*t* were heated to 174° C. Once the temperature was uniform at the thermocouple locations, sample 15 was allowed to cool under pressure and vacuum to 52° C. The temperature gradient profiles 40*a*,41*a*,42*a* within sample 15 tested according to the data shown in FIG. 2 are shown in FIGS. 3A, B, C for respective plateaus 40,41,42. The data of FIGS. 3A, B, C indicate that a larger temperature gradient may be maintained at the higher temperatures (viz., plateaus 41,42). The temperature gradient was observed to be nearly linear across the thickness of sample 15**.

Numerous samples of FM 5064 were cured in the equipment of FIG. 1 for examination of microstructure to test the advancing cure front method of the invention. Thorough examination by optical microscopy of the microstructure of each sample following cure revealed an absence of microcracks and a minimum of microvoid and agglomerated filler regions as compared to control samples cured conventionally by the standard bleeder cloth/vacuum bag method.

Figure 4:
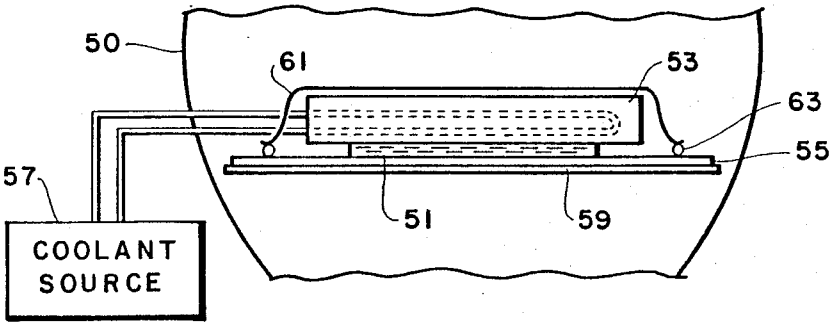
FIG. 4 is a schematic of an autoclave setup useful in practicing the advancing gel front method of the invention.

For comparative purposes, a further sample 15' of FM 5064, identical in size and thickness to samples 15 above, was cured in the system of FIG. 1 as just described except that the temperature program followed the median temperature spread seen by samples 15 and no temperature differential was maintained across sample 15'; all other pressure and vacuum parameters were the same as for samples 15. Sample 15' exhibited very little cure stress microcracking on a polished surface taken from the center thereof, but a relatively large amount of voids were found at about the 7-ply and 23-ply levels, which indicate that the advancing gel front method of the invention results in significant reduction of the number and size of voids in cured laminate samples in addition to a reduction of stress microcracking. The advancing gel front process which characterizes the invention apparently promotes a thermodynamically controlled polymerization within a curing laminate which favors linear chain growth; a higher (as compared to conventionally cured laminate) molecular weight is likely achieved before gelation. As a result, much shrinkage which occurs after gelation in laminates cured conventionally generally occurs in laminates cured according to the invention prior to gelation when stress relaxation by molecular translation is easily achieved. Referring now to FIG. 4, shown therein is a representative autoclave 50 setup useful for curing laminates according to the advancing gel front method of the invention. Laminate sample 51 of FM 5064 with peel plies is disposed between a plates 53,55 of aluminum or other good conductor. plate 53 is controllably cooled by coolant source 57 of circulating ethylene glycol/water mixture or the like operatively connected to plate 53. plate 55 is controllably heated by (resistance) heater 59. Flexible vacuum enclosure 61 is sealed against plate 55 by peripheral seal 63, enclosing cooled plate 53. and is operatively connected to a vacuum source (not shown in FIG. 4) in manner described above in reference to FIG. 1. With the FIG. 4 arrangement, a temperature differential of 56° C. may be maintained across the thickness of sample 51. In demonstration of the invention utilizing the system of FIG. 4 for curing laminates, sample 51 was heated to 79° C., at which point resin within the laminate is viscous. Plate 53 was maintained at this temperature while that of plate 55 was raised to 107° C.

It is therefore seen that in the cure of resin impregnated laminate composite structures according to the invention at temperatures in the range of from about 20° to 200° C., maintaining a temperature differential across the thickness of the laminate of about 10°–30° C. during the heating program of the laminate and allowing the cooler side of the laminate to breathe, generates a gel front which advances toward the cooler side and promotes the removal ahead of the advancing front of volatile constituents. The invention may be particularly applicable to the cure of composites of the polyimide and phenolic types.

The invention as herein described therefore provides an improved method for controlling resin cure in the fabrication of composite laminate materials. It is understood that certain modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A method for curing resin in the fabrication of a composite material, comprising the steps of:

(a) enclosing composite material including resin to be cured within a flexible vacuum enclosure;

(b) providing a press having a first platen and a second platen and including means to selectively heat said first platen and said second platen; and (c) substantially simultaneously:

(i) pressing said composite material including resin within said enclosure between said first platen and said second platen of said press to preselected pressure, (ii) evacuating said enclosure containing said composite material including resin, (iii) selectively heating said first platen and said second platen according to a preselected scheme to respective preselected first and second temperatures to establish a preselected temperature differential across the thickness of said composite material including resin, the higher of said first and second temperatures being selected sufficiently high to cure said resin first at the surface of said composite material including resin adjacent the platen heated to said higher of said first and second temperatures and said temperature differential is selected sufficiently large to promote cure of said resin progressively across the thickness of said composite material including resin toward the other platen heated to the lower of said first and second temperatures.

2. The method as recited in claim 1 further comprising, following step (c) thereof, the step of heating both said first platen and said second platen to said higher of said first and second temperatures to effect complete cure of said resin.

3. The method as recited in claim 1 wherein said composite material including resin is a phenolic resin preimpregnated graphite laminate.

4. The method as recited in claim 1 wherein said pressing of said composite mateial including resin is performed at a pressure of from about 150 to about 250 psi.

5. The method as recited in claim 3 wherein said higher of said first and second temperatures is selected in the range of from about 100° to about 110° C.

6. The method as recited in claim 5 wherein said preselected temperature differential is selected in the range of from about 15° to about 30° C.

* * * * *